United States Patent [19]

Johnson

[11] Patent Number: 4,677,598

[45] Date of Patent: Jun. 30, 1987

[54] SEISMIC DATA ACQUISITION METHOD

[75] Inventor: Philip W. Johnson, New Orleans, La.

[73] Assignee: Standard Oil Company (Indiana), Chicago, Ill.

[21] Appl. No.: 478,971

[22] Filed: Mar. 25, 1983

[51] Int. Cl.$^4$ .............................................. G01V 1/36
[52] U.S. Cl. ...................................... 367/56; 367/50; 367/58; 364/421
[58] Field of Search ........................ 367/50, 56, 58, 55; 364/421

[56] References Cited

U.S. PATENT DOCUMENTS

| | | | |
|---|---|---|---|
| 2,732,906 | 1/1956 | Mayne .................................... | 367/56 |
| 3,352,377 | 11/1967 | Cetrone et al. ........................ | 367/56 |
| 3,381,266 | 4/1968 | Harris ..................................... | 367/50 |
| 3,539,982 | 11/1970 | Hileman et al. ....................... | 367/50 |
| 3,597,727 | 8/1971 | Judson et al. .......................... | 367/50 |
| 3,688,249 | 8/1972 | Backus et al. .......................... | 367/62 |
| 3,775,738 | 11/1973 | Quay et al. ............................. | 367/56 |
| 3,790,929 | 2/1974 | Mayne et al. .......................... | 367/21 |
| 3,794,827 | 2/1974 | Widess .................................... | 367/56 |
| 4,001,770 | 1/1977 | Hofer ...................................... | 367/56 |
| 4,048,612 | 9/1977 | Lawyer ................................... | 367/61 |
| 4,316,268 | 2/1982 | Ostrander ............................... | 367/68 |
| 4,467,460 | 8/1984 | Johnson .................................. | 367/56 |

OTHER PUBLICATIONS

"Generating Bicubic Spline Coefficients on a Large Regular Grid," Davis et al., Computers & Geosciences, vol. 16, pp. 1-6.

"On the Resolution of Statics Structure and Residual Normal Moveout," M. Marcoux, Geophysics, vol. 46, #7, 7/81.

"Interval Velocity Estimation . . . 3D . . . ," Zilkha et al., SEG Meeting Preprint, Oct. 11-15, 1981.

Lorenz Shock, "Roll-Along and Drop-Along Seismic Techniques," Papers of the Field Geophysicist, vol. 28, #5, 10/63.

Wiggins et l., "Residual Statics Analysis . . . ," Geophysics, vol. 41, #5, (10/76), pp. 922-938.

Primary Examiner—Nelson Moskowitz
Assistant Examiner—Ian J. Lobo
Attorney, Agent, or Firm—Timothy D. Stanley

[57] ABSTRACT

Three-dimensional seismic prospecting is conducted using a less than complete multifold array of seismic sources and receivers which are positioned so that the resulting system of linear static connection equations according to common depth point are continuously coupled.

11 Claims, 5 Drawing Figures

SEISMIC DATA ACQUISITION METHOD

FIELD OF THE INVENTION

The invention relates to three-dimensional (3-D) seismic exploration and more particularly to methods and arrays for the acquisition of partial multifold seismic data.

BACKGROUND OF THE INVENTION

In common-depth-point (CDP) stacking, signals, associated with a given CDP or reflection point but recorded at a number of source and receiver locations are composited ("stacked") either by field processors or in a playback center to produce a CDP stack. The signals are typically corrected for normal move out (NMO) and statics before stacking. CDP shooting produces redundant or "multifold" data from which a CDP stack can be made.

Arrays, that is, arrangements or patterns of sources and receivers, for taking multifold data for producing three-dimensional representations or profiles of seismic structure are known. One such array is the Broad-Line Profile Array represented in FIG. 1, labeled "Prior Art."

Referring to FIG. 1 in detail, FIG. 1 represents generally a portion of a Broad-Line Profile Array such as is known in the art and illustrates an areal recording geometry which will produce three-dimensional seismic coverage in 4-fold, if 96 trace records (8 cross-spreads of 12 receiver groups each) are recorded (only 4 cross-spreads are illustrated). Source locations are represented by the symbol "O", and receiver locations are represented by the symbol "X". An x,y coordinate system is provided in FIG. 1 and enables each source and receiver location to be represented ("indexed") by a pair of integers, i.e., an (x,y) doublet. Numbers in parentheses represent illustrative (x,y) doublets for certain source and receiver locations indicated in FIG. 1. The dashed lines P represent the boundaries of the Broad-line profile for which multifold data can be obtained using the illustrated recording and source geometry.

A common field method for taking multifold data for CDP stacking is the "roll-along" method, in which a plurality of sets of seismic shots are initiated at intervals, for example, in the broad line, and for each set of seismic shots, the set of seismic receivers is moved along ("rolled along"), for example, the broad line. The method of roll-along for the illustrative array of FIG. 1 is readily apparent. Twelve equally spaced shots can be made between the receiver cross-spreads at coordinates y=52 and y=100 and then, for example, the first receiver cross-spread at coordinate y=4 can be rolled forward to coordinate y=196 (not shown) before the next twelve equally spaced shots are taken between coordinates y=102 and continuing to coordinate y=146.

As indicated above, prior to CDP stacking or compositing, the signals from the receivers are typically corrected for NMO and statics. Corrections for statics in two-dimensional seismic recording can be obtained by solving the system of standard static correction equations characterized as follows:

$$T_{i,r} = I_i + R_r + C_d + (X_i^2{}_r M_d) \quad \text{(A)}$$

$$d = i + r$$

wherein i is the source location index; r is the group index; d is the depth index; $t_{i,r}$ is the observed two-way time for the seismic energy to travel the particular ray path from source point, i, to receiver group, r; $I_i$ is the initiation static-error term, $R_r$ is the receiver static error term, $C_d$ is the true two-way time which is desired for mapping, and the product $X_i^2{}_r M_d$ is the NMO correction term.

SUMMARY OF THE INVENTION

Statics Corrections for 3-D Seismic Exploration

Corrections for statics in three-dimensional seismic recording can be obtained by solving (for example, by the method of least squares) a system of static correction equations characterized as follows:

$$T_{i,j,r,s} = I_{i,j} + R_{r,s} + C_{m,n} + [X^2{}_{i,j,r,s}]M_{m,n} + E_{i,j,r,s} \quad \text{(B)}$$

where:

$T_{i,j,r,s}$ is the observed record time $I_{i,j}$ is the required initiation correction in milliseconds (ms)

$R_{r,s}$ is the required reception correction in ms $C_{m,n}$ is the geologic structure datum in ms $X_{i,j,r,s}$ is the range fraction (of the base spread)

$M_{m,n}$ is the Base Spread residual normal moveout (RNMO) in ms $E_{i,j,r,s}$ is the random picking error and:

i,j are the x,y source location indices on a minimum grid r,s are the x,y receiver group location indices on a minimum grid and m,n are the x,y depth indices as hereinafter defined.

The squared range fraction $X^2{}_{i,j,r,s}$ is computed from:

$$X^2_{i,j,r,s} = \frac{[(i-r)^2 + (j-s)^2]Wx}{X^2_{BS}}$$

where $X_{BS}$ is the base spread distance, and Wx is the minimum grid interval as hereinafter defined. This establishes the range at which the Residual Normal Moveout is to be calculated.

DEFINITIONS

The term "regular grid" means a rectangular grid having spacing constant between grid points in each of the x and the y dimensions and having x units and y units such that each active receiver group and source point can be defined by an (x,y) doublet where x and y are both integers.

The term "minimum grid" means a regular grid such that the x intervals and y intervals between respective active receiver groups and source points can be defined by minimum integers consistent with defining the locations of all active receiver groups and source points in an array.

The term "minimum grid interval" means grid interval or spacing, in a respective dimension, between grid points of a minimum grid. It will be appreciated by those skilled in seismic prospecting that the minimum grid interval often corresponds to the receiver group interval.

The phrase "complete multifold" 3-dimensional seismic array or method means an array or method effective for 3-dimensional CDP seismic prospecting having receiver groups and source points at every grid point of a minimum grid.

The phrase "partial multifold" 3-dimensional seismic array or method means an array or method effective for 3-dimensional CDP seismic prospecting wherein receiver groups and/or source points are omitted from at least some of the grid points of the minimum grid.

The phrase "subset of equations according to common depth point" (SCDP) means a set of equations of the form a Equation B as set forth above which can be written for a common depth point (CDP).

In seismic prospecting using partial multifold 3-dimensional seismic arrays, any two SCDP, corresponding, for example, to two common depth points (CDP) can show either "reception decoupling" or "initiation decoupling" in either the x- or the y-dimension. Two SCDP can show (1) reception decoupling in the x-dimension when neither SCDP contains $R_{r,s}$ and $R_{q,s}$ where $r \neq q$, (2) reception decoupling in the y-dimension when neither SCDP contains $R_{r,s}$ and $R_{r,t}$ where $s \neq t$, (3) initiation decoupling in the x-dimension when neither SCDP contains $I_{i,j}$ and $I_{h,j}$ where $i \neq h$, and (4) initiation decoupling in the y-dimension when neither SCDP contains $I_{i,j}$ and $I_{i,k}$ where $j \neq k$.

In the respective converse situations, any two SCDP can show (1) reception coupling in the x-dimension, (2) reception coupling in the y-dimension, (3) initiation coupling in the x-dimension, and (4) initiation coupling in the y-dimension. Such coupling of two SCDP is referred to herein as "direct coupling" in the respective dimension. Two SCDP can also show "indirect coupling" in a respective dimension where the first SCDP although not directly coupled to the second SCDP is directly coupled to another SCDP which is, directly or indirectly, coupled to the second SCDP.

As used herein, "continuous coupling" means that no SCDP of a set of equations according to common depth point exists which does not show, directly or indirectly, (1) reception coupling in each of the x- and y-dimensions and (2) initiation coupling in each of the x- and y-dimensions.

BRIEF DESCRIPTION OF THE INVENTION

According to the invention is a partial multifold 3-dimensional seismic array and method wherein sources and receivers of a partial multifold 3-dimensional seismic array are positioned so that the resulting system of linear static correction equations according to common depth point is continuously coupled. The source points are arranged with respect to the receiver points so that each seismic source and detector is at a stationary preselected location during the time of source initiation and the taking of seismic data to assure taking data with respect to common depth points.

Further, according to the invention is such an array and method wherein at least portions of such an array are moved (rolled along) to provide partial multifold three-dimensional common-depth-point coverage of an extended portion of the earth's subsurface.

BRIEF DESCRIPTION OF THE DRAWINGS

The invention will be better understood from the following detailed description and from the drawings in which:

FIG. 1 illustrates subsurface coverage from the Broad-Line Profile of FIG. 1.

DETAILED DESCRIPTION OF THE INVENTION

Decoupling of Statics Solutions as a Consequence of Array Geometry

Figure 1:
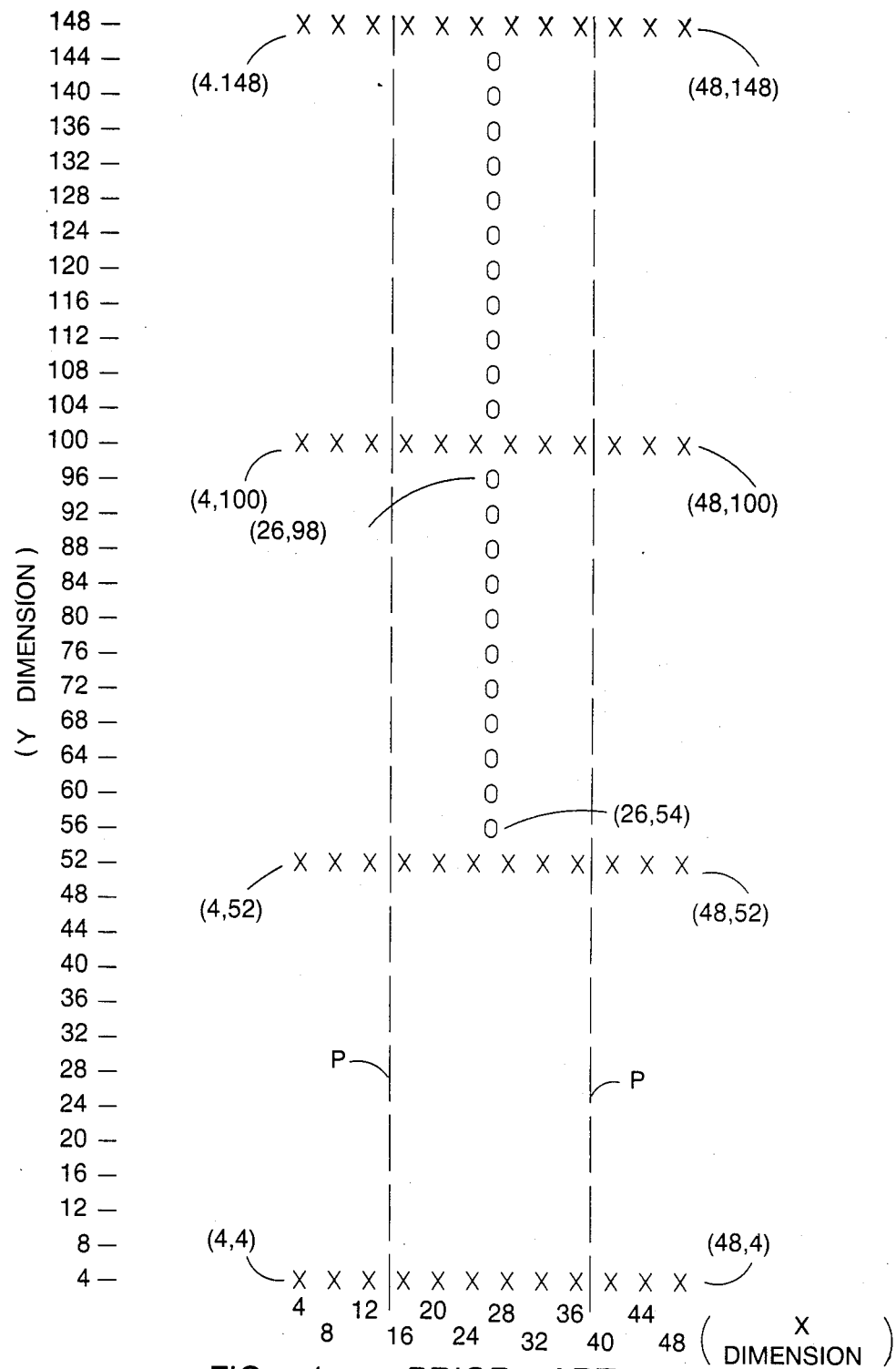
FIG. 1 represents generally a portion of a Broad-Line Profile Array such as is known in the art.
Figure 2:
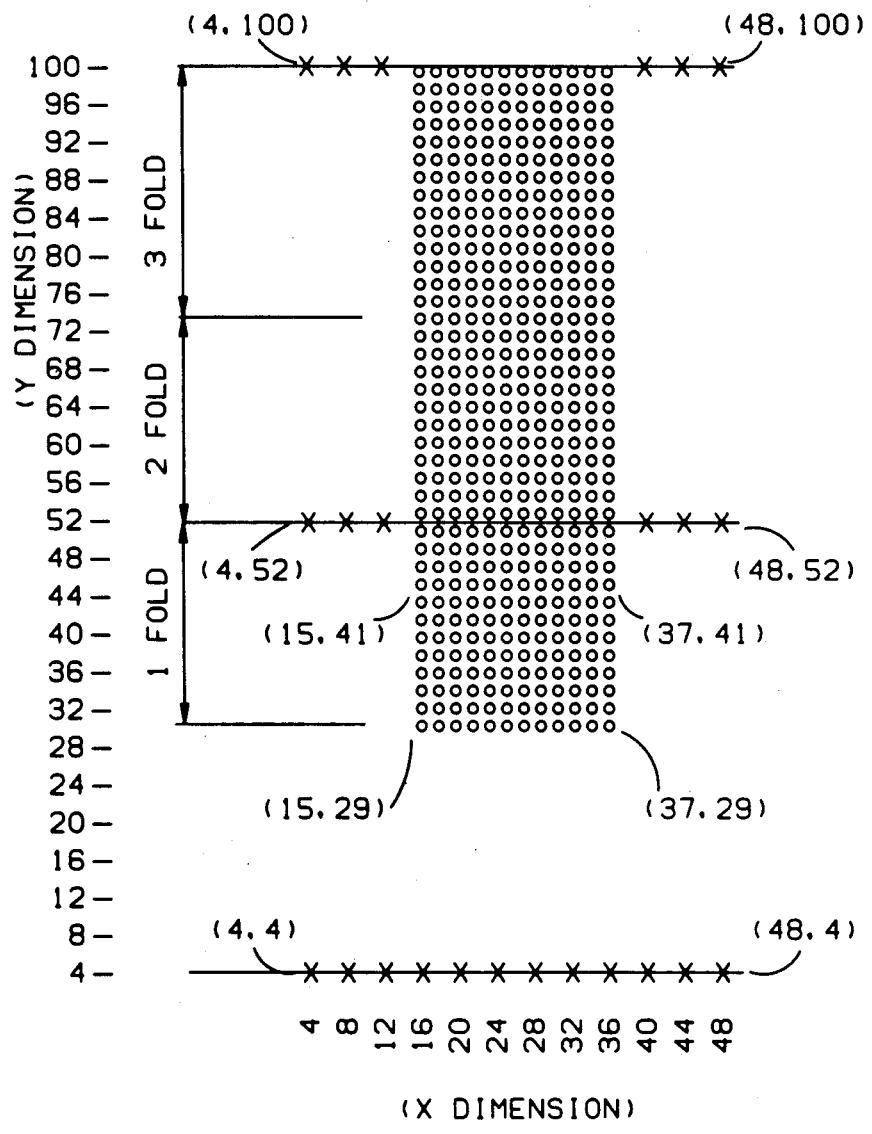

The problem of decoupling of solutions to the statics correction equations is a consequence of the pattern (array) used to record the data. Decoupling in 3-D seismic data acquisition can be very complex because it commonly involves source point index as well as receiver group index decoupling, and the x and y indices decouple separately. The example shown in FIG. 1 and FIG. 2 can be shown, for example, to have 144 independent sets of decoupled equations. Each of the sets can have, for example, a least squares solution, but due to picking errors the solution may drift away from the other 143 solutions which affect nearby depth points and therefore induce a "checkerboard" effect in the apparent seismic structure. Note that FIG. 1 and FIG. 2 are only twofold and therefore have no least square statics solution. At least 3-fold recording is required to build up an excess of equations over unknowns for least squares solution. Nevertheless, the illustrations of FIG. 1 and FIG. 2 are sufficient to illustrate the decoupling of 3-D statics solutions.

For the illustrative array of FIG. 1, the source location indices can be given by doublets of the form (i,j), where:

$$i = 2 \frac{2(x - x_o)}{\Delta} + 4$$

and $$j = 2 \frac{2(y - y_o)}{\Delta} + 4$$

where $x_o, y_o$ is the "corner" of the surface array which is nearest the coordinate origin and $\Delta$ is the predetermined ("model") receiver group interval, and the square brackets [ ] indicate the integer (rounded) value of a number. The additive factor of 4 can be used to assure nonzero indices for programming purposes. If in-line receiver group intervals and cross-line receiver group intervals are not equal, that is, if the x-units and the y-units of the coordinate system are not equal, then $\Delta$ can be the least-common-divisor for the two.

The receiver group indices of any particular receiver group can then be given by (r,s) where $$r = \tilde{x}_r = 4 \frac{(x - x_o)}{\Delta} + 4$$

is the x index of the receiver and $$s = \tilde{y} = 4 \frac{(y - y_o)}{\Delta} + 4$$

is the y index of the receiver.

The source location indices can differ slightly in form, as shown, from the receiver group location indices to allow for sources positioned between the receiver groups.

The depth index (m,n) is given by:

$$m = \frac{i + r}{2}, \quad n = \frac{j + s}{2}. \tag{C}$$

It should be noted that the three sets of indices are to the same scale and constitute a new set of x-y coordinates. No loss of generality is suffered if the factor of ½ is dropped; however, the scale of the depth indices is then no longer the same as that of the group and source locations.

The above equations represent a scheme for computing surface and subsurface indices which works for shooting on the receiver group or between the receiver groups. The scheme is general, i.e., does not depend upon the shooting geometry, and is computed directly from the surveyors' x-y coordinates for the source locations and receiver group locations. The indices differ from those of conventional two-dimensional shooting in that they are doublets, i.e., (x,y) pairs.

FIG. 2 illustrates subsurface coverage from the Broad Line Profile of FIG. 1 and represents single fold common-depth-point coverage from the 12-shot profile of FIG. 1 with additional 2-fold coverage obtained from a single roll-along. The depth indices can be computed from the source and receiver group indices of FIG. 1 by means of equation (C). As indicated above, the Broad Line Profile of FIG. 1 is only one of many schemes for 3-D surveying. The equations and inventions herein described are considered applicable to all of them, and thus, the invention, although hereafter described in terms of specific methods of 3-D data collecting, is considered applicable broadly to any type of 3-D seismic data acquisition.

Table I shows the source and receiver x- and y-dimensional indices for a two-fold (two-trace) example based on FIG. 1.

TABLE I

| CDP | Trace 1 | | Trace 2 | |
|---|---|---|---|---|
| (m,n) | (r,s) | (i,j) | (r,s) | (i,j) |
| (15,101) | (4,100) | (26,102) | (4,148) | (26,54) |
| (17,101) | (8,100) | (26,102) | (8,148) | (26,54) |
| (19,101) | (12,100) | (26,102) | (12,148) | (26,54) |
| (21,101) | (16,100) | (26,102) | (16,148) | (26,54) |
| (23,101) | (20,100) | (26,102) | (20,148) | (26,54) |
| (25,101) | (24,100) | (26,102) | (24,148) | (26,54) |
| (27,101) | (28,100) | (26,102) | (28,148) | (26,54) |
| (29,101) | (32,100) | (26,102) | (32,148) | (26,54) |
| (31,101) | (36,100) | (26,102) | (36,148) | (26,54) |
| (33,101) | (40,100) | (26,102) | (40,148) | (26,54) |
| (35,101) | (44,100) | (26,102) | (44,148) | (26,54) |
| (37,101) | (48,100) | (26,102) | (48,148) | (26,54) |
| (15,103) | (4,100) | (26,106) | (4,148) | (26,58) |
| (17,103) | (8,100) | (26,106) | (8,148) | (26,58) |
| (19,103) | (12,100) | (26,106) | (12,148) | (26,58) |
| (21,103) | (16,100) | (26,106) | (16,148) | (26,58) |
| (23,103) | (20,100) | (26,106) | (20,148) | (26,58) |
| (25,103) | (24,100) | (26,106) | (24,148) | (26,58) |
| (27,103) | (28,100) | (26,106) | (28,148) | (26,58) |
| (29,103) | (32,100) | (26,106) | (32,148) | (26,58) |
| (31,103) | (36,100) | (26,106) | (36,148) | (26,58) |
| (33,103) | (40,100) | (26,106) | (40,148) | (26,58) |
| (35,103) | (44,100) | (26,106) | (44,148) | (26,58) |
| (37,103) | (48,100) | (26,106) | (48,148) | (26,58) |
| (15,105) | (4,100) | (26,110) | (4,148) | (26,62) |
| (17,105) | (8,100) | (26,110) | (8,148) | (26,62) |
| (19,105) | (12,100) | (26,110) | (12,148) | (26,62) |
| (21,105) | (16,100) | (26,110) | (16,148) | (26,62) |
| (23,105) | (20,100) | (26,110) | (20,148) | (26,62) |
| (25,105) | (24,100) | (26,110) | (24,148) | (26,62) |
| (27,105) | (28,100) | (26,110) | (28,148) | (26,62) |
| (29,105) | (32,100) | (26,110) | (32,148) | (26,62) |
| (31,105) | (36,100) | (26,110) | (36,148) | (26,62) |
| (33,105) | (40,100) | (26,110) | (40,148) | (26,62) |
| (35,105) | (44,100) | (26,110) | (44,148) | (26,62) |
| (37,105) | (48,100) | (26,110) | (48,148) | (26,62) |

Reference to Table I shows that the receiver x-dimensional index r will be decoupled such that there will be 12 independent solutions for $R_{r,s}$, (r=4, 8, ..., 48). These are decoupled because there is no SCDP, which contains $R_{r,s}$ and $R_{q,s}$ where $r \neq q$, thus there is no reception coupling in the x-dimension of the solutions for $R_{r,s}$.

Table I further shows that although there is no reception coupling in the x-dimension, there is reception coupling in the y-dimension (s-indices). Reference to FIG. 1 shows that s may take on only the values s=4, 52, 100, 148 for the example of FIG. 1. Reference to Table I shows that for every CDP, s=100 and s=148 for Trace 1 and Trace 2, respectively. This implies continuous reception coupling in the y-dimension since s=100 and s=148 are adjacent elements in the s-sequence, that is, are one group interval spaced apart in the y-dimension.

With regard to initiation coupling, Table I shows that the sources suffer from a 12-fold decoupling in the y-dimension (j-index). For each CDP the difference in j-index for Trace 1 and Trace 2 is 48. This implies a 12-fold decoupling because, as shown in FIG. 1, the sources are four units apart. In this example, there is no source decoupling in the x-dimension because the x-dimension index i is the same for all SCDP of the set of equations according to common depth point.

The net decoupling of FIG. 1 and Table I is therefore 12×12=144 independent sets of solutions as determined by the least squares method.

CONTINUOUS COUPLING IN PARTIAL MULTIFOLD THREE-DIMENSIONAL CDP SEISMIC PROSPECTING

According to the invention is a method and array for partial multifold three-dimensional CDP seismic prospecting wherein some, and preferably a substantial number, of the source points and active receiver groups needed for complete multifold prospecting are omitted and the remaining source points and receiver groups are arranged so that the resulting set of statics equations according to common depth point are continuously coupled.

Three-dimensional seismic prospecting can be accomplished by a variety of methods. For example, these methods can include such as the Broad Line Profile illustrated herein in FIGS. 1 through 5, the 3-dimensional "sweep" method in which a crew "sweeps" across an area to be explored in a zig-zag manner to accomplish coverage of the entire subsurface of interest, the side-square method, and other methods. The invented method is considered applicable to all of these and other methods of partial multifold 3-dimensional CDP seismic prospecting.

The basic dimensional unit of an array can be considered to be the minimum grid interval, corresponding in many cases to the receiver group interval. An array for complete multifold three-dimensional CDP seismic prospecting can be laid out on a rectangular grid using the minimum grid interval as the basic dimensional unit.

If every grid point is used as a receiver group location *and* sources are placed either on or between every grid point, then the resulting SCDP will all be continuously coupled. However, such an array is uneconomic and is not currently preferred.

Similarly, an array can be laid out with sufficient geophones and seismic source points to provide three-dimensional common depth point coverage of the earth's subsurface in the entire area being surveyed. Such a method, however, is unnecessarily costly in terms of providing and locating receiver groups and seismic source points. Consequently, currently preferred are various methods in which relatively small array(s) comprising receiver groups and sources are located on the surface of the earth in a portion of the area being surveyed and are moved or rolled along to eventually produce subsurface coverage in the entire area being surveyed. If the receiver groups and seismic source points for the entire area are plotted, a "composite array" results showing the locations of the receiver groups and seismic sources if the same coverage were to be obtained from a single array.

According to one embodiment of the invention is an array and a method for partial multifold three-dimensional CDP seismic prospecting wherein (1) each receiver group is one minimum grid interval spaced apart in the x-dimension and one minimum grid interval spaced apart in the y-dimension from at least one other receiver group and (2) each source point is one minimum grid interval spaced apart in the x-dimension and in the y-dimension one minimum grid interval spaced apart from at least one other source point.

Figure 3:
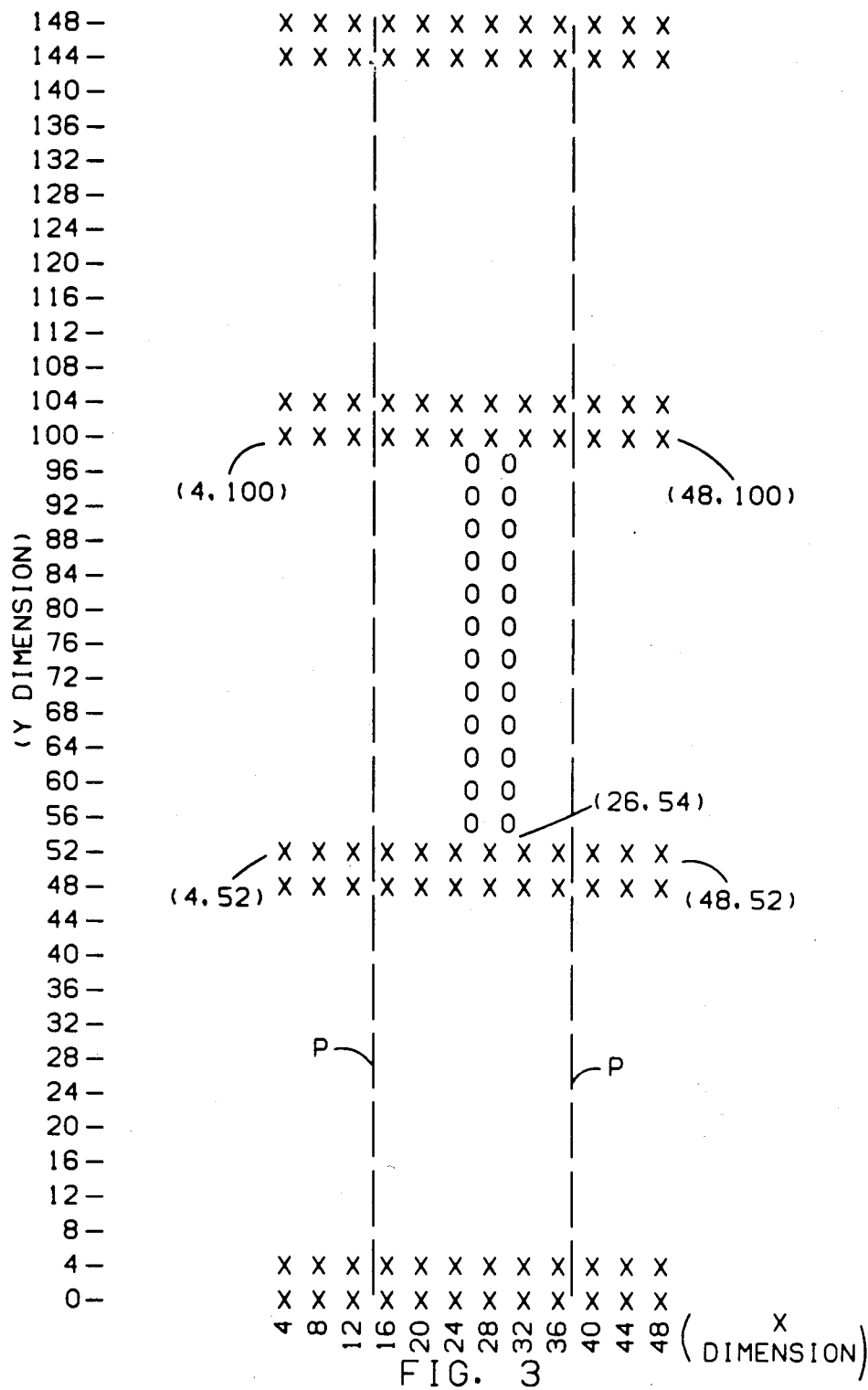
FIGS. 3, 4, and 5 illustrate embodiments of the instant invention.

Referring now in detail to the embodiment of FIG. 3, the Broad Line Profile array of FIG. 1 is modified to provide continuous coupling as herein defined. The cross-spread of receiver groups in FIG. 1 is replaced by two cross-spreads or rows of receiver groups one minimum grid interval apart in the y dimension. The lengthwise spread of sources in FIG. 1 is replaced by two lengthwise spreads or rows of sources one minimum grid interval apart in the x-dimension. Inspection of FIG. 3 will reveal that each receiver group and source point is one minimum grid interval spaced apart in each of the x-dimension and y-dimension from at least one other receiver group and source, respectively.

Figure 4:
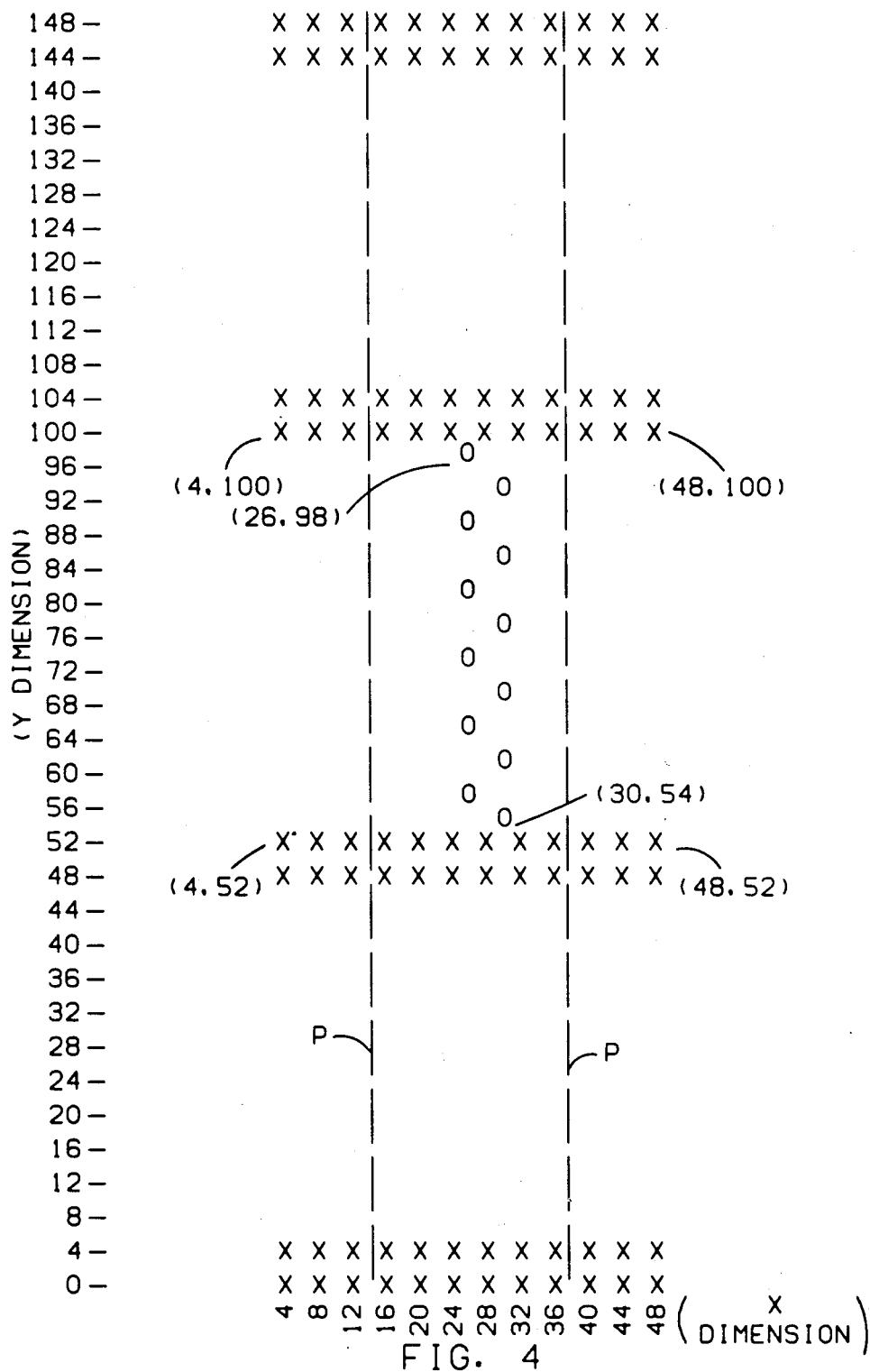

Referring now in detail to the embodiment of FIG. 4, sources are omitted from the array pattern of FIG. 3 in a zig-zag pattern. This pattern is more economical of sources; nevertheless, inspection reveals that each source point is still one minimum grid interval distant in each of the x-dimension and the y-dimension from at least one other source point.

The principle can, of course, be extended yet further. Thus, in the embodiment of FIG. 5 the source pattern is produced by laying down three lengthwise spreads of source points each one minimum grid interval from the next and then omitting source points such that each remaining source point is one minimum grid interval spaced apart in the x-dimension and in the y dimension from at least one other source point.

Many other arrangements according to the invention will be apparent to those skilled in the art of three-dimensional seismic prospecting who will appreciate that the invention is not limited to the embodiments described herein. The particular embodiment preferred in a practical situation depends upon the controlling considerations. Thus, for example, the embodiment of FIG. 3 is readily implemented by field crews familiar with conventional three-dimensional seismic prospecting. For purposes of economy, however, the embodiments of FIG. 4 or FIG. 5 may be preferred even though more difficult to implement in the field. Similarly, one skilled in the art will appreciate that the arrangement of FIG. 5 will result in a more "feathering" at the edges of the three-dimensional seismic profile than the embodiment of FIG. 4 so that in appropriate instances FIG. 4 might be preferred.

Figure 5:
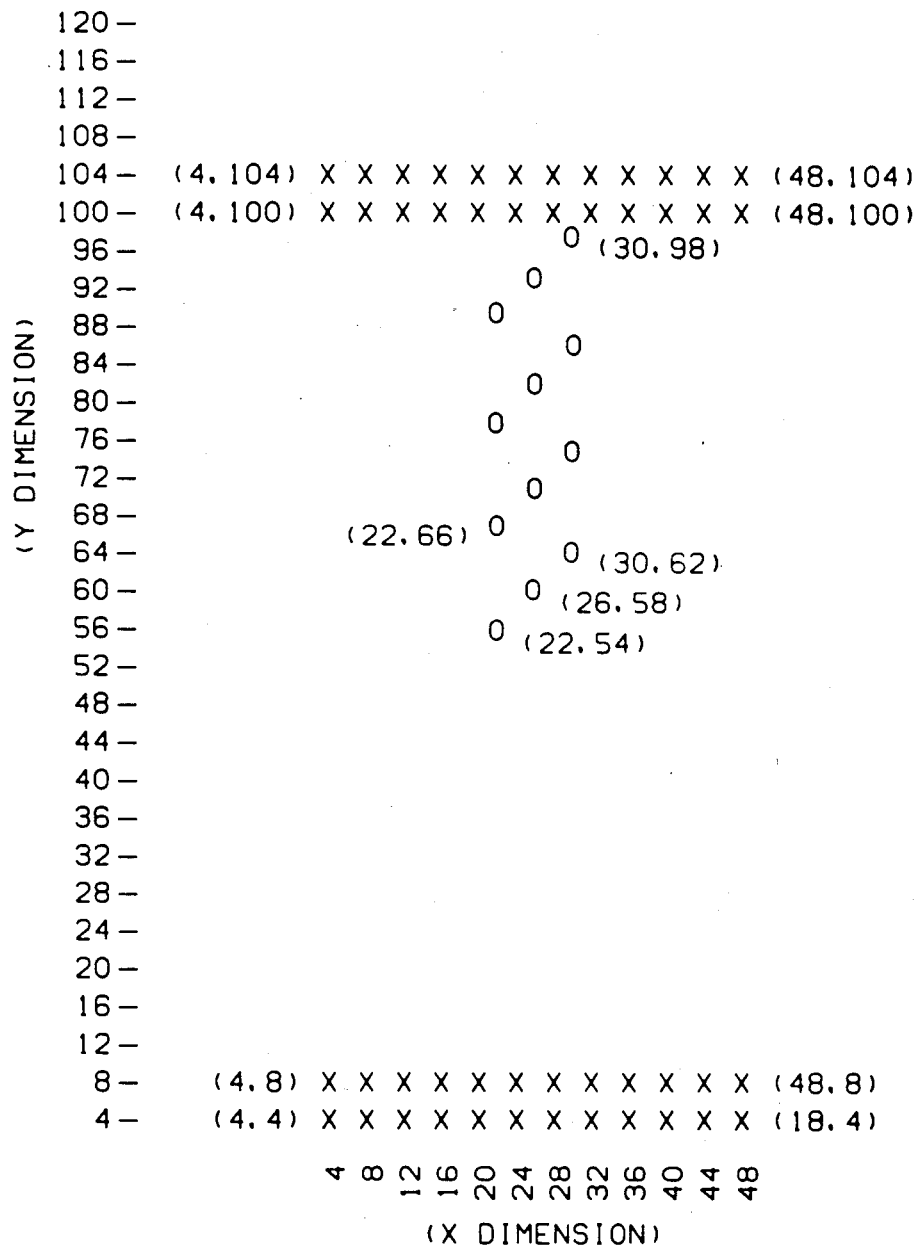

Table II further illustrates the invention by showing the source and receiver x- and y-dimensional indices for a two-fold (two-trace) example based on FIG. 5.

TABLE II

| CDP (m,n) | Trace 1 (r,s) | Trace 1 (i,j) | Trace 2 (r,s) | Trace 2 (i,j) |
|---|---|---|---|---|
| (15,101) | (8,100) | (22,102) | | |
| (17,101) | (12,100) | (22,102) | (4,104) | (30,980) |
| (19,101) | (16,100) | (22,102) | (8,104) | (30,980) |
| (21,101) | (20,100) | (22,102) | (12,104) | (30,980) |
| (23,101) | (24,100) | (22,102) | (16,104) | (30,980) |
| (25,101) | (28,100) | (22,102) | (20,104) | (30,980) |
| (27,101) | (32,100) | (22,102) | (24,104) | (30,980) |
| (29,101) | (36,100) | (22,102) | (28,104) | (30,980) |
| (31,101) | (40,100) | (22,102) | (32,104) | (30,980) |
| (33,101) | (44,100) | (22,102) | (34,104) | (30,980) |
| (35,101) | (48,100) | (22,102) | (36,104) | (30,980) |
| (15,103) | (8,104) | (22,102) | (4,100) | (26,106) |
| (17,103) | (12,104) | (22,102) | (8,100) | (26,106) |
| (19,103) | (16,104) | (22,102) | (12,100) | (26,106) |
| (21,103) | (20,104) | (22,102) | (16,100) | (26,106) |
| (23,103) | (24,104) | (22,102) | (20,100) | (26,106) |
| (25,103) | (28,104) | (22,102) | (24,100) | (26,106) |
| (27,103) | (32,104) | (22,102) | (28,100) | (26,106) |
| (29,103) | (36,104) | (22,102) | (32,100) | (26,106) |
| (31,103) | (40,104) | (22,102) | (36,100) | (26,106) |
| (33,103) | (44,104) | (22,102) | (40,100) | (26,106) |
| (35,103) | (44,104) | (22,102) | (44,100) | (26,106) |
| (15,105) | (4,104) | (26,106) | (4,100) | (30,110) |
| (17,105) | (8,104) | (26,106) | (8,100) | (30,110) |
| (19,105) | (12,104) | (26,106) | (12,100) | (30,110) |
| (21,105) | (16,104) | (26,106) | (16,100) | (30,110) |
| (23,105) | (20,104) | (26,106) | (20,100) | (30,110) |
| (25,105) | (24,104) | (26,106) | (24,100) | (30,110) |
| (27,105) | (28,104) | (26,106) | (28,100) | (30,110) |
| (29,105) | (32,104) | (26,106) | (32,100) | (30,110) |
| (31,105) | (36,104) | (26,106) | (36,100) | (30,110) |
| (33,105) | (40,104) | (26,106) | (40,100) | (30,110) |
| (35,105) | (44,104) | (26,106) | | |

Inspection of Table II shows that reception and initiation coupling has indeed been achieved and at very low cost in terms of source points.

CONTINUOUS PARTIAL-MULTIFOLD THREE-DIMENSIONAL CDP SEISMIC PROFILING

According to the invention is method for moving at least portions of partial multifold three-dimensional CDP seismic prospecting according to the invention to provide additional three-dimensional common-depth-point coverage of an extended portion of the earth's subsurface.

In order to accomplish continuous coupling as the array is rolled along, it is necessary only to insure that the subsurface explored before roll-along has at least one CDP in common with the subsurface explored after the roll-along. The method of "roll along" for the pattern of FIG. 1 is readily apparent. Twelve equally spaced shots are taken between the middle two cross-spreads (y=52 and y=100) and then the first cross-spread at y=4 is rolled forward to the position of y=196 before the next 12 shots are taken, starting at y=102 and continuing to y=146.

(As will be appreciated by those skilled in the art of seismic prospecting, the number of traces per record for this geometry is equal to the number of cross-spreads times 12. For 3-fold 3-D data recorded in the geometry of FIG. 1, at least four rolls along are required before an excess of equations over unknowns is achieved. This is a function of the particular shooting geometry and should be examined carefully before a short line is planned. The minimum number of traces per record is also a function of geometry of recording.)

The method of "roll along" for the pattern of FIG. 5 is much less apparent than for FIG. 1's pattern. FIG. 5 is a modification of FIG. 1 in accordance with the invention. The cross-spread at y=52 of FIG. 1 has been pulled back to y=8, and y=148 has been pulled back to y=104. The Roll Along Procedure is then analogous to that of FIG. 1. The first 12 shots are in the same y positions although staggered in x position. After the shots from y=54 to y=98 have been taken, the y=4 cross-spread is rolled forward to y=196 and the next 12 shots are taken; then the y=8 cross-spread is rolled to y=200.

Although the invention has been described as required in terms of preferred embodiments and illustrated by example and illustration, the invention is not to be considered limited thereby but by the scope of the claims appended hereto.

What is claimed is:

1. A method for the acquisition of partial multifold 3-dimensional CDP seismic data in which at least some of the sources and receivers necessary for complete multifold seismic CDP coverage are omitted wherein:
   active receiver groups are disposed in sets at grid points of a receiver minimum grid, the active receiver groups of each set being spaced apart from other active receiver groups of the set so that each active receiver group is one receiver minimum grid interval in a first dimension and one receiver minimum grid interval in a second dimension from at least one other active receiver group of the set; and
   sources are initiated at grid points of a source minimum grid so that each source is one source minimum grid interval in the first dimension and one source minimum grid interval in the second dimension from at least one other source, each source and receiver group being at preselected locations during the time of source initiation and the taking of seismic data with respect to common depth point, whereby the resulting system of linear static correction equations are continuously coupled.

2. Method as in claim 1 wherein:
   the active receiver groups of each set are disposed in rows of active receiver groups in the second dimension, the rows of active receiver groups of each set being one receiver minimum grid interval spaced apart in the first dimension; and
   the sources are initiated in rows of sources in the first dimension, the rows of sources being one source minimum grid interval spaced apart in the second dimension.

3. Method as in claim 2 wherein:
   a set of active receiver groups comprises at least two rows of active receiver groups; and
   the sources are initiated in at least two rows of sources.

4. Method as in claim 3 wherein:
   the sources are initiated in at least three rows of sources.

5. An array for the acquisition of partial multifold 3-dimensional CDP seismic data in which at least some of the active receiver groups and sources necessary for complete multifold seismic coverage are omitted wherein:
   active receiver groups are disposed at grid points of a receiver minimum grid so that each active receiver group is one receiver minimum grid interval in a first dimension and one receiver minimum grid interval in a second dimension from at least one other active receiver group; and
   sources are initiated at preselected grid points of the receiver minimum grid so that each source is one receiver minimum grid interval in the first dimension and one receiver minimum grid interval in the second dimension from at least one other source, each source and receiver group being at preselected locations during the time of source initiation and the taking of seismic data with respect to common depth point, whereby the resulting system of linear static correction equations are continuously coupled.

6. Apparatus as in claim 5 wherein:
   the active receiver groups are disposed in sets of active receiver groups so that each of at least some of the active receiver groups of each set is one receiver minimum grid interval from at least one other active receiver group of said set in each of the first dimension and the second dimension.

7. Apparatus as in claim 6 wherein:
   the sources are initiated so that each of at least some of the sources are spaced apart from a nearest other source by one receiver minimum grid interval in each the first dimension and the second dimension.

8. Apparatus as in claim 7 wherein:
   each set of active receiver groups is disposed in a double row of receiver groups, each row of the double row being one receiver minimum grid interval apart in the first dimension from another row of the double row;
   the sources are initiated in double rows of sources from each other row of the double row, each row of the double row being one receiver minimum grid interval apart in the second dimension from another row.

9. Apparatus as in claim 8 wherein:
   each set of active receiver groups are disposed in two rows of active receiver groups one receiver minimum grid interval apart in the first dimension; and
   the sources are initiated in more than two rows of sources, each row of sources being spaced apart by one receiver minimum grid interval in the second dimension from at least one other row of sources.

10. Apparatus as in claim 7 wherein:
    the sources are initiated in three rows of sources.

11. A method of 3-D seismic prospecting, wherein a 3-D array of source and active receiver groups for full-fold common depth point technique is altered to reduce the required number of records without substantial detrimental effects to the interpretability of the resulting seismic sections comprising:
    omitting at least some of the source and active receiver groups of the array of the 3-D full-fold common depth point technique; and
    arranging the remaining source and active receiver groups of the array so that the resulting system of linear static correction equations according to common depth point are continuously coupled, each source and receiver group being at preselected locations during the time of source initiation and the taking of seismic data with respect to common depth point, whereby the resulting system of linear static correction equations are continuously coupled.

* * * * *